United States Patent Office 3,185,621
Patented May 25, 1965

3,185,621
METHOD FOR CONTROL OF NEMATODES WITH DITHIOCARBAMIC ACID DERIVATIVES
Alfred Margot, Basel, Switzerland, assignor to
J. R. Geigy A.-G., Basel, Switzerland
No Drawing. Original application Nov. 20, 1961, Ser. No. 153,716. Divided and this application Dec. 28, 1962, Ser. No. 253,019
Claims priority, application Switzerland, Nov. 21, 1960, 13,006/60
6 Claims. (Cl. 167—30)

This invention relates to compositions containing new dithiocarbamic acid derivatives and use of these derivatives and compositions for the control of nematodes parasitic on plants.

This application is a division of application Serial No. 153,716, filed November 20, 1961, now abandoned.

The new dithiocarbamic acid derivatives are N-methyl-S - phenylmercapto - dithiocarbamates of the general formula

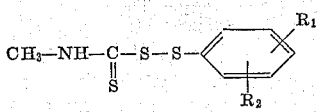
(I)

wherein
$R_1$ is hydrogen, bromine, chlorine, a lower alkyl or $NO_2$, of these hydrogen, chlorine, methyl and nitro being particularly advantageous, and
$R_2$ is hydrogen, chlorine or lower alkyl, of these hydrogen and chlorine being particularly advantageous.

In the above, lower alkyl is an alkyl containing 1–4 carbon atoms, e.g. methyl, ethyl, propyl, isopropyl, butyl, tert. butyl and sec. butyl.

It has been found that these N-methyl-S-phenylmercapto-dithiocarbamates of Formula I have an excellent effect against nematodes in the soil which are harmful to plants.

The new active substances of the general Formula I are prepared according to the invention by reacting, preferably in aqueous medium, a salt of N-monomethyl-dithiocarbamic acid with a benzenesulphenyl halide, substituted if desired, of the general formula

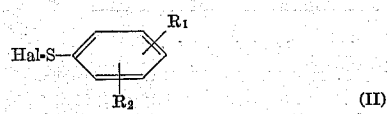
(II)

in which Hal represents chlorine or bromine and $R_1$ and $R_2$ have the meaning given above. It is not necessary to isolate the starting salt obtained as an aqueous solution in the reaction of carbon disulphide with methylamine and alkali liquor; the aqueous solution can be used direct for the reaction with the benezenesulphenyl halide of Formula II. The salts of N-monomethyl-dithiocarbamic acid used are preferably the alkali metal salts, for example, the salts of sodium or potassium as well as the ammonium salt. The benzenesulphenyl halide used is preferably the chloride. The reaction is advantageously effected at a temperature between 10 and 30° C., the end product being precipitated in crystalline form in good yield and of the required purity.

The starting substances of the general formula II are generally known or can easily be prepared by known methods, for example for treating thiophenol with gaseous chlorine in carbon tetrachloride at 0–5° C. As starting substances of Formula II may be mentioned the following: benzenesulphenyl chloride, p-toluene-sulphenyl chloride, p-nitrobenzene-sulphenyl chloride, 3,4-dichlorobenzene-sulphenyl chloride, p-chlorobenzene-sulphenyl chloride, p-bromobenzene-sulphenyl chloride, 2 - chloro - 4 - nitrobenzene-sulphenyl chloride, 3-methyl-4-chlorobenzene-sulphenyl chloride, 3,4-dimethylbenzene-sulphenyl chloride and so forth.

The application of the new compounds of Formula I to the control of nematodes may be effected in the solid form, for example as a finely powdered scattering agent or as a granulated composition, and also in liquid form as an emulsion, suspension, spray liquor or solution. For use, a solid or liquid agricultural carrier can be employed. The choice of the form of application depends upon the intended method of application, which in its turn depends especially on the type of nematode to be controlled, the cultivated plants to be protected, the climate and the soil conditions as well as the technical operating conditions.

An even as possible a distribution of the active substances throughout a layer of earth about 15–25 cm. deep can be advantageous, the amount of active substance required in this case being generally about 50–250 kg. per hectare. It is also possible, however, to make a particular application, for example, one limited to dibber holes or furrows and, sometimes, even a sufficient protective action is attained with a reduced amount of active substance.

Dusts and scattering agents are especially suitable for application to unplanted areas, before or simultaneously with the harrowing or other mechanical soil cultivation, which ensures a fine distribution of the agents in the top layer of soil. Further, these agents may also be dusted or scattered into seed drills or in furrows drawn between existing plants.

Dusts may be prepared on the one hand by mixing or grinding together the active substances with a solid pulverulent water-insoluble or sparingly soluble carrier substance. As such may be used, for example: talcum, diatomaceous earth, kieselguhr, kaolin, bentonite, calcium carbonate, boric acid or tricalcium phosphate. On the other hand, the active substances may also be mounted on the carrier substances by means of a volatile solvent. For the production of scattering agents and granulated compositions, either coarser-grained and/or specifically heavier carrier substances may be used, such as for example, fairly coarsely ground limestone or sand, or mixtures of the active substance with finer-grained possibly porous carrier substances may be granulated.

In addition, scattering agents may also contain as carrier substances in coarser-grained, possibly granulated form, solid substances of greater solubility in water or citrate, for example synthetic fertilisers such as solubilised calcium phosphates or other calcium, potassium or ammonium salts, phosphates or nitrates. Emulsions may be applied both to unplanted land or, owing to their power of penetration, in existing plant cultivation. For their preparation the active substances, after dissolving in organic solvents, such as xylene, may be emulsified in water which contains a surface-active substance. In the use of emulsions it is usually advantageous in practice first to prepare concentrates by combination of active substance with inert organic solvents and/or suitable emulsifiers, which concentrates can be treated with water to give emulsions ready for use.

Suspensions may be obtained by direct suspending of the moist active substance in water, which if necessary may contain a surface-active substance, or by suspending wettable powders which in their turn are prepared by combination of the solid active substance with surface-active substances or with solid pulverulent carrier substances and with surface-active substances.

A suitable form of application also consists in the use of unadulterated solutions of active substances according to the invention as, for example, in halogenated hydrocarbons or in mineral oils etc.

The active substances according to the invention are not phytotoxic in the amounts used in practice. If desired, the biological activity of the agents according to the invention may be supplemented by addition of fungicides, herbicides or insecticides, or of further nematocidal substances. A combination with other plant protection agents or any optional ingredients which influence the nematocidal action in any desired direction is likewise possible.

In the following example the preparation of the new compounds according to the invention is more precisely illustrated. Parts therein are parts by weight and the temperatures are given in degrees centigrade.

*Example 1*

For the preparation of the starting substance, 360 parts of a 35% aqueous methyl amine solution are allowed to flow into a mixture of 304 parts of carbon disulphide and 800 parts by volume of water at a temperature of 10–12° with good stirring, and stirring is continued for half an hour at the same temperature. Then a solution of 160 parts of NaOH in 800 parts by volume of water is added at 10–12° and the mixture is further stirred for two to three hours at room temperature, when the sodium salt of the monomethyldithiocarbamic acid is formed in the solution.

The clear aqueous solution of this salt is then slowly mixed with 478 parts of benzenesulphenyl chloride (phenyl sulphur chloride) at a temperature of 10–20° with vigorous stirring, when after a short time the desired N-methyl-S-phenylmercapto-dithiocarbamate begins to precipitate in solid form. To complete the reaction, stirring is continued for a few hours at room temperature, the product is filtered off by suction and then washed with water. After recrystallisation from cyclohexane, the colourless N - methyl - S-phenylmercapto-dithiocarbamate obtained melts at 63–64°.

In an analogous way the following active substances of the general Formula I are obtained by reaction of corresponding amounts of nuclear-substituted benzenesulphenyl chlorides with alkali metal salts of N-methyl-dithiocarbamic acid:

N-methyl-S-(p-tolylmercapto)-dithiocarbamate,
N-methyl-S-(3,4-dichlorophenylmercapto)-dithiocarbamate,
N-methyl-S-(p-nitrophenylmercapto)-dithiocarbamate,
N-methyl-S-(p-bromophenylmercapto)-dithiocarbamate,
N-methyl-S-(2-chloro-4-nitrophenylmercapto)-dithiocarbamate,
N-methyl-S-(3-methyl-4-chlorophenylmercapto)-dithiocarbamate,
N-methyl-S-(3,4-dimethylphenylmercapto)-dithiocarbamate.

The following examples are typical examples of application:

*Example 2*

20 parts of N-methyl-S-phenylmercapto-dithiocarbamate and 80 parts of talcum are milled to the greatest degree of fineness in a ball mill. The mixture obtained serves as a dust.

*Example 3*

20 parts of N-methyl-S-p-nitrophenylmercapto-dithiocarbamate are dissolved in a mixture of 48 parts of diacetone alcohol, 16 parts of xylene and 16 parts of an anhydrous, high molecular condensation product of ethylene oxide (Triton X-100). This concentrate can be diluted with water to form emulsions of any concentration desired.

*Example 4*

80 parts of N-methyl-S-p-tolylmercapto-dithiocarbamate are mixed with 2–4 parts of a wetting agent i.e. a sulphuric acid ester of an alkyl polyglycol ether, 1–3 parts of a conventional protective colloid e.g. polyvinyl alcohol and 15 parts of kaolin as an inert solid carrier. The mixture is then finely milled in a suitable mill. The wettable powder obtained can be stirred with water and produces very stable suspensions.

*Example 5*

5 parts of N-methyl-S-3,4 - dichlorophenylmercapto-dithiocarbamate are mixed and milled with 95 parts by weight of calcium carbonate (ground limestone). The product can be used as a sprinkling agent.

*Example 6*

5 parts of N-methyl-S-phenylmercapto-dithiocarbamate are mixed with 95 parts of pulverulent sand and the mixture is moistened with 1–5 parts by weight of water. The mixture is then granulated.

Before granulating, a great excess, e.g. 100–900 parts of a synthetic fertiliser, e.g. ammonium sulphate, can be mixed with the above mixture or one containing more of an active ingredient, e.g. containing 10 parts of active ingredient and 90 parts of calcium carbonate.

Merely to illustrate the activity of the new dithiocarbamates, the following test was performed.

The quantity of the dithiocarbamic acid derivatives to be tested required for obtaining the desired concentraton of active substance (quantity consumed) is intimately mixed with 20 cc. of washed dry sand and the mixture is blended with 1 litre of natural soil which is infected with *Meloidogyne arenaria*. After leaving for 7 days, the soil is divided into three pots and two tomato cuttings are set in each. After 9 weeks the nodules formed on the roots of the plants are counted. The results are reproduced below:

| Dithiocarbamate | Average number of gals. from 3 pots | | | |
|---|---|---|---|---|
| | Amount used in p.p.m. | | | Control |
| | 50 | 100 | 200 | |
| N-methyl-S-phenylmercapto- (M.P.63-64°) | 0 | 0 | 0 | 199 |
| N-methyl-S-p-tolylmercapto- (M.P. 94-95°) | 11 | 0 | 0 | 103 |
| N-methyl-S-3,4-dichlorophenyl-mercapto- (M.P.95-96°) | 0 | 0 | 0 | 199 |
| N-methyl-S-p-nitrophenylmer-capto- (M.P. 113-114°) | 18 | 2 | 0 | 199 |

What is claimed is:

1. A method of controlling plant-parasitic nematodes which comprises introducing into at least the surface layer of a soil serving for the cultivation of plants and in an amount sufficient to control nematodes, an agricultural composition comprising an N-methyl-S-phenylmercapto-dithiocarbamate of the formula

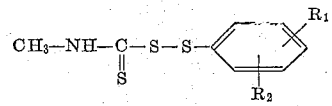

wherein
$R_1$ is a member selected from the group consisting of hydrogen, bromine, chlorine, lower alkyl and nitro, and
$R_2$ is a member selected from the group consisting of hydrogen, chlorine and lower alkyl, and an agricultural carrier.

2. A method of controlling plant-parasitic nematodes which comprises introducing into at least the surface layer of a soil serving for the cultivation of plants and in an amount sufficient to control nematodes, an agricultural composition comprising N-methyl-S-phenylmercapto-dithiocarbamate and an agricultural carrier.

3. A method of controlling plant-parasitic nematodes which comprises introducing into at least the surface layer of a soil serving for the cultivation of plants and in an amount sufficient to control nematodes, an agricultural composition comprising N - methyl-S-(p-tolylmercapto)-dithiocarbamate and an agricultural carrier.

4. A method of controlling plant-parasitic nematodes which comprises introducing into at least the surface layer of a soil serving for the cultivation of plants and in an amount sufficient to control nematodes, an agricultural composition comprising N-methyl-S-(3,4-dichlorophenyl-mercapto)-dithiocarbamate and an agricultural carrier.

5. A method of controlling plant-parasitic nematodes which comprises introducing into at least the surface layer of a soil serving for the cultivation of plants and in an amount sufficient to control nematodes, an agricultural composition comprising N-methyl-S-(p-nitrophenylmer-capto)-dithiocarbamate and an agricultural carrier.

6. A method of controlling plant-parasitic nematodes which comprises introducing into at least the surface layer of a soil serving for the cultivation of plants and in an amount sufficient to control nematodes, N-methyl-S-phenylmercapto-dithiocarbamate of the formula

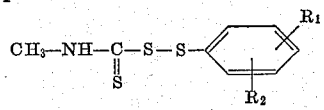

wherein
$R_1$ is a member selected from the group consisting of hydrogen, bromine, chlorine, lower alkyl and nitro, and
$R_2$ is a member selected from the group consisting of hydrogen, chlorine and lower alkyl.

References Cited by the Examiner
UNITED STATES PATENTS

| | | | |
|---|---|---|---|
| 2,024,613 | 12/35 | Teppema | 260—16 |
| 2,943,972 | 7/60 | Van der Kerk | 167—30 |
| 3,075,875 | 1/63 | Margot | 167—30 |

LEWIS GOTTS, *Primary Examiner.*
JULIAN S. LEVITT, *Examiner.*